United States Patent
Godin

(10) Patent No.: US 11,019,546 B2
(45) Date of Patent: May 25, 2021

(54) SWITCHING OF UPLINK USER PLANE TERMINATION POINT OF A SERVING GATEWAY FOR A BEARER IN DUAL CONNECTIVITY OPERATION

(71) Applicant: Alcatel Lucent, Boulogne-Billancourt (FR)

(72) Inventor: Philippe Godin, Nozay (FR)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/127,063

(22) PCT Filed: Mar. 10, 2015

(86) PCT No.: PCT/EP2015/054948
§ 371 (c)(1),
(2) Date: Sep. 19, 2016

(87) PCT Pub. No.: WO2015/140006
PCT Pub. Date: Sep. 24, 2015

(65) Prior Publication Data
US 2018/0035343 A1    Feb. 1, 2018

(30) Foreign Application Priority Data
Mar. 19, 2014    (EP) .................................... 14305390

(51) Int. Cl.
*H04W 36/28*    (2009.01)
*H04W 76/15*    (2018.01)
(Continued)

(52) U.S. Cl.
CPC ....... *H04W 36/28* (2013.01); *H04W 36/0069* (2018.08); *H04W 36/22* (2013.01); *H04W 76/15* (2018.02)

(58) Field of Classification Search
None
See application file for complete search history.

(56) References Cited

U.S. PATENT DOCUMENTS

| | | | | |
|---|---|---|---|---|
| 2011/0075675 A1* | 3/2011 | Koodli | ................... | H04L 12/14 370/401 |
| 2012/0314689 A1* | 12/2012 | Wang | ................... | H04W 36/12 370/331 |

(Continued)

FOREIGN PATENT DOCUMENTS

| | | |
|---|---|---|
| CN | 101868002 A | 10/2010 |
| CN | 103139911 A | 6/2013 |

(Continued)

OTHER PUBLICATIONS

Alcatel-Lucent et al., "Response LS on system aspects for Small Cell Enhancement work in RAN", 3GPP Draft; R3-140257, Feb. 9, 2014, XP050738697.

(Continued)

*Primary Examiner* — Andre Tacdiran
(74) *Attorney, Agent, or Firm* — Harness, Dickey & Pierce, P.L.C.

(57) ABSTRACT

Methods and apparatuses are provided to facilitate switching of an uplink serving gateway termination point of a bearer that is offloaded from a master eNodeB (MeNB) to a secondary eNodeB (SeNB) in a dual connectivity operation. A signal is transmitted to the SeNB, via the MeNB, that includes addressing information of a new uplink serving gateway (S-GW) user plane termination point for the offloaded bearer. The addressing information is transmitted via the MeNB to the SeNB in a modification request message, such as an evolved radio access bearer (E-RAB) modification request message, and may include Internet Protocol (IP) addressing information and a Tunnel Endpoint Identifier (TEID).

9 Claims, 4 Drawing Sheets

Figure 1:
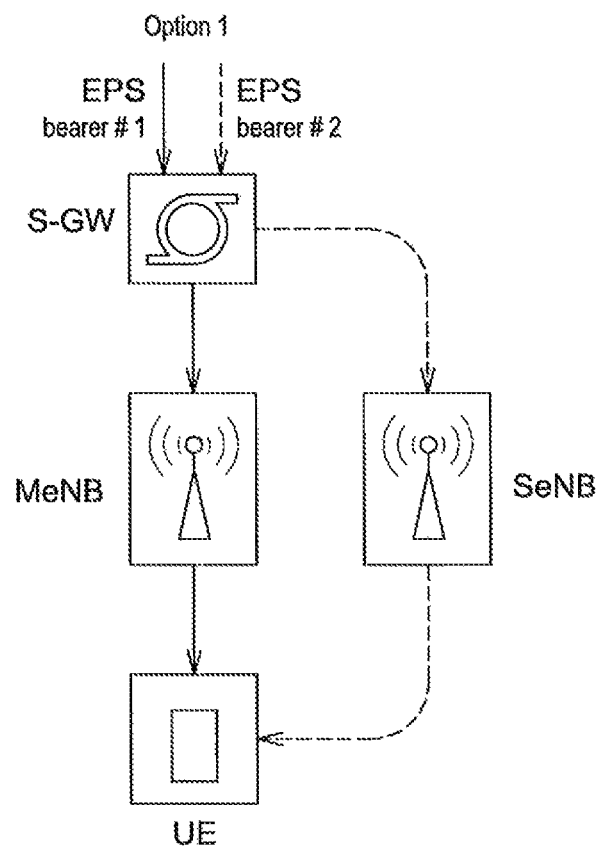

(51) Int. Cl.
*H04W 36/00* (2009.01)
*H04W 36/22* (2009.01)

(56) References Cited

U.S. PATENT DOCUMENTS

| | | | | |
|---|---|---|---|---|
| 2014/0010207 A1* | 1/2014 | Horn | H04W 36/165 | 370/332 |
| 2014/0082697 A1* | 3/2014 | Watfa | H04W 76/15 | 726/3 |
| 2014/0369197 A1* | 12/2014 | Stenfelt | H04W 28/0289 | 370/235 |
| 2015/0049719 A1* | 2/2015 | Qi | H04W 76/022 | 370/329 |
| 2015/0085845 A1* | 3/2015 | Wang | H04W 76/022 | 370/338 |
| 2015/0181470 A1* | 6/2015 | Chai | H04W 36/0005 | 455/438 |
| 2015/0181473 A1* | 6/2015 | Horn | H04W 76/15 | 370/331 |
| 2015/0195743 A1* | 7/2015 | Sirotkin | H04W 28/08 | 370/235 |
| 2015/0201352 A1* | 7/2015 | Shan | H04W 52/243 | 370/235 |
| 2015/0208235 A1* | 7/2015 | Ingale | H04W 12/04 | 455/411 |
| 2015/0208283 A1* | 7/2015 | Yang | H04W 36/04 | 370/331 |
| 2015/0215826 A1* | 7/2015 | Yamada | H04W 36/0072 | 455/436 |
| 2015/0223284 A1* | 8/2015 | Jain | H04W 52/04 | 370/329 |
| 2015/0282017 A1* | 10/2015 | Wang | H04W 8/02 | 370/331 |
| 2015/0334606 A1* | 11/2015 | Sun | H04W 36/00 | 370/331 |
| 2015/0365993 A1* | 12/2015 | Aminaka | H04W 76/15 | 370/329 |
| 2016/0135174 A1* | 5/2016 | Lee | H04W 76/10 | 370/329 |
| 2016/0174285 A1* | 6/2016 | Ke | H04W 8/06 | 370/329 |
| 2016/0227459 A1* | 8/2016 | Fujishiro | H04W 16/32 | |
| 2016/0249259 A1* | 8/2016 | Park | H04W 36/00 | |
| 2016/0309379 A1* | 10/2016 | Pelletier | H04W 76/12 | |
| 2016/0323926 A1* | 11/2016 | Gao | H04W 28/08 | |
| 2016/0337270 A1* | 11/2016 | Heinonen | H04L 12/4633 | |
| 2017/0019914 A1* | 1/2017 | Rune | H04W 72/1268 | |
| 2017/0078927 A1* | 3/2017 | Hahn | H04W 40/36 | |
| 2018/0124117 A1* | 5/2018 | Delsol | H04L 63/20 | |

FOREIGN PATENT DOCUMENTS

| | | |
|---|---|---|
| CN | 103458398 A | 12/2013 |
| CN | 104735638 A | 6/2015 |
| GB | 2482449 A | 2/2012 |
| WO | WO-2014/026543 A1 | 2/2014 |
| WO | WO-2015/065010 A1 | 5/2015 |

OTHER PUBLICATIONS

Alcatel-Lucent et al., "LIPA/SITO Support in dual connectivity (SA2 point 9)", 3GPP Draft; R3-140256, Jan. 31, 2014, XP050755730.
New Path Switch Procedure for Dual Connectivity. Alcatel-Lucent, Alcatel-Lucent Shanhai Bell. 3GPP TSG-RAN WG3 Meeting #83bis. R3-140775. San Jose del Cabo, Mexico, Mar. 31-Apr. 4, 2014.
Specific issues on E-RAB management and Bearer Type. LG Electronics Inc. 3GPP TSG-RAN WG3 Meeting #83. R3-140280. Prague, Czech Republic, Feb. 10-14, 2014.
International Search Report PCT/ISA/210 for International Application No. PCT/EP2015/054948 dated May 27, 2015.
Written Opinion of the International Searching Authority PCT/ISA/237 for International Application No. PCT/EP2015/054948 dated May 27, 2015.
Ericsson, "Overall procedures for offloading over Xn", 3GPP Draft:, R3-131794, 3rd Generation Partnership Project (3GPP), Mobile Competence Centre, vol. RAN WG2, Sep. 28, 2013.
Alcatel-Lucent Shanghai Bell et al., "Signalling Flows for dual connectivity architecture 1A", 3GPP Draft, R3-132168 S1MME, 3rd Generation Partnership Project (3GPP), vol. RAN WG3, Nov. 2, 2013.
Intel Corporation, S1 versus X2 Approach for Dual Connectivity, 3GPP Draft, R2-131406 S1, 3rd Generation Partnership Project (3GPP), vol. RAN WG2, Apr. 6, 2013.
Ericsson, "LS on Handling of unrecognised TEID/TLA during Path Switch Procedure", 3GPP Draft, S2-091812_S091588_R3-090646, 3rd Generation Partnership Project (3GPP), Mar. 17, 2009.
3rd Generation Partnership Project, "Technical Specification Group Radio Access Network, Study on Small Cell Enhancements for -EUTRA and E-UTRAN High layer aspects (Release 12)", 3GPP Standard, 3GPP TR 36.842, 3rd Generation Partnership Project (3GPP), vol. RAN WG2, No. V12.3.3, 07 Jan. 7, 2014.
"Evaluation method for current load balancing mechanisms in the context of UMTS-LTE interworking" 3GPP TSG-RAN WG3 , R3-131403, Aug. 2013.
Alcatel-Lucent Shanghai Bell et al., "Signalling Flows for dual connectivity architecture 1A", 3GPP TSG-RAN WG3 Meeting #82. R3-132168, Nov. 15, 2013.
Office Action dated Mar. 16, 2020 in Chinese Application No. 201580026435.6.

\* cited by examiner

SWITCHING OF UPLINK USER PLANE TERMINATION POINT OF A SERVING GATEWAY FOR A BEARER IN DUAL CONNECTIVITY OPERATION

CROSS-REFERENCE TO RELATED APPLICATIONS

This application is the U.S. National Phase application of PCT Application No. PCT/EP2015/054948 filed on Mar. 10, 2015, which claims priority to European Patent Application No. 14305390.8 filed on Mar. 19, 2014, the entire contents of each of which are incorporated herein by reference.

The present invention generally relates to mobile communication networks and systems.

Detailed descriptions of mobile communication networks and systems can be found in the literature, such as in particular in Technical Specifications published by standardization bodies such as for example 3GPP ($3^{rd}$ Generation Partnership Project).

An example of packet mobile communication system is Evolved Packet System EPS (specified in particular in 3GPP TS 23.401).

An EPS network comprises a Core Network (CN) called Evolved Packet Core EPC accessed by a Radio Access Network (RAN) called E-UTRAN. EPS network nodes include in particular: E-UTRAN node called eNodeB (eNB), EPC control plane node called Mobility Management Entity (MME), and EPC node called Serving Gateway (SGW). Interfaces between EPS network nodes include in particular: X2 interface between eNBs, S1-MME interface between eNB and MME (in the control plane), and S1-U interface between eNB and S-GW (in the user plane).

An EPS network provides connectivity to an User Equipment (UE). This includes providing EPS bearer(s), including E-UTRAN Radio Access Bearer E-RAB between UE and SGW, in turn including a radio bearer between UE and eNB, and an S1 bearer between eNB and SGW. An S1 bearer is implemented by a tunnel (called GTP-U tunnel). Traffic of an S1 bearer can be sent in uplink (UL) from eNB to SGW, and/or in downlink (DL) from SGW to eNB. An S1 bearer has S1-U termination points: in eNB (S1-U uplink and/or downlink eNB termination point) and in SGW (S1-U uplink and/or downlink SGW termination point).

There may be similar concepts in other systems (other than EPS), whether 3GPP or non 3GPP-based.

Network densification using small cells is an important evolution of such systems, enabling to cope with mobile traffic explosion. Small cell enhancements are in the process of being standardized, in particular by 3GPP.

Small cell enhancements include in particular a dual connectivity operation, defined in particular in 3GPP TR 36.842, as an operation where a given UE consumes radio resources provided by at least two different network points (Master and Secondary eNBs) connected with non-ideal backhaul, while in connected state. Different options have been proposed for bearer split between Master eNB (MeNB) and Secondary eNB (SeNB), including in particular Option 1 whose principle is recalled in FIG. 1 taken from 3GPP TR 36.842. Different alternatives have been proposed for protocol architectures in MeNB and SeNB, including in particular Alternative 1A whose principle is recalled in FIG. 2 taken from 3GPP TR 36.842.

Alternative 1A thus defined in 3GPP TR 36.842 enables that some bearer(s) of an UE may be served by the SeNB (or in other words may be offloaded from the MeNB to the SeNB), while other bearer(s) are only served by the MeNB. Only one S1-MME connection for the UE is however provided, terminated at the MeNB.

There is a need to allow switching the S1-U uplink SGW termination point for a bearer which is being offloaded or has been offloaded (said offloading involving a change of DL and/or UL eNB S1-U termination point) from a MeNB to a SeNB, in dual connectivity operation. More generally there is a need to improve the dual connectivity operation, in particular for Alternative 1A.

Embodiments of the present invention in particular address such needs.

These and other objects are achieved, in one aspect, by a method for allowing switching an S1-U uplink SGW termination point of a bearer during, respectively after, offloading of said bearer from a eNB referred to as Master eNB MeNB, to a eNB referred to as Secondary eNB SeNB, in a dual connectivity operation, said method including:

signaling to said SeNB, via said MeNB, during, respectively after, offloading of said bearer, addressing information of a new S1-U uplink SGW user plane termination point to be used for said bearer after said switching.

These and other objects are achieved, in other aspects, by entities for performing such method and/or individual step(s) of such method, said entities including, in particular (though not exclusively), for example for an EPS network: eNB, and Mobility Management Entity MME.

These and other objects are achieved, in one aspect, by a Mobility Management Entity MME, adapted to:

signal to a eNB referred to as Master eNB MeNB in a dual connectivity operation, during, respectively after, offloading of a bearer from said MeNB to a eNB referred to as Secondary eNB SeNB in said dual connectivity operation, addressing information of a new S1-U uplink SGW user plane termination point in a Serving Gateway SGW, to be used for said bearer.

These and other objects are achieved, in another aspect, by a eNB, said eNB referred to as Master eNB MeNB in a dual connectivity operation, said eNB adapted to:

receive from a Mobility Management Entity MME during, respectively after, offloading of a bearer from said MeNB to an eNB referred to as Secondary eNB SeNB in said dual connectivity operation, signal to said SeNB during, respectively after, offloading of said bearer, addressing information of a new S1-U uplink SGW user plane termination point in a Serving Gateway SGW, to be used for said bearer.

These and other objects are achieved, in another aspect, by a eNB, said eNB referred to as Secondary eNB SeNB in a dual connectivity operation, said eNB adapted to:

receive from a eNB referred to as Master eNB MeNB in said dual connectivity operation, during, respectively after, offloading of a bearer from said MeNB to said MeNB, addressing information of a new S1-U uplink SGW user plane termination point in a Serving Gateway SGW for said bearer, use said addressing information for routing of uplink user plane traffic of said bearer to said new S1-U uplink SGW user plane termination point.

Figure 2:
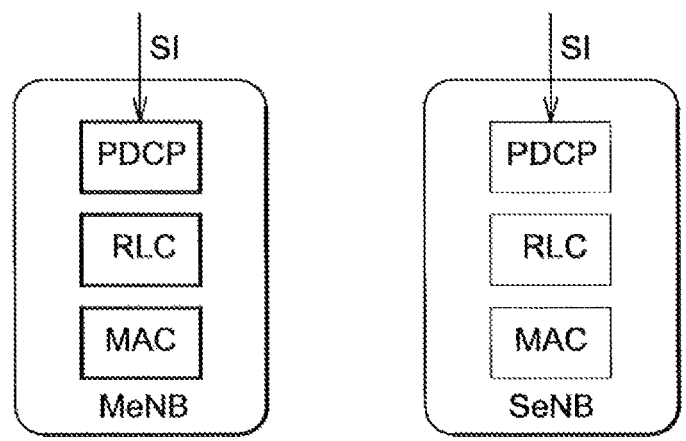
Figure 3:
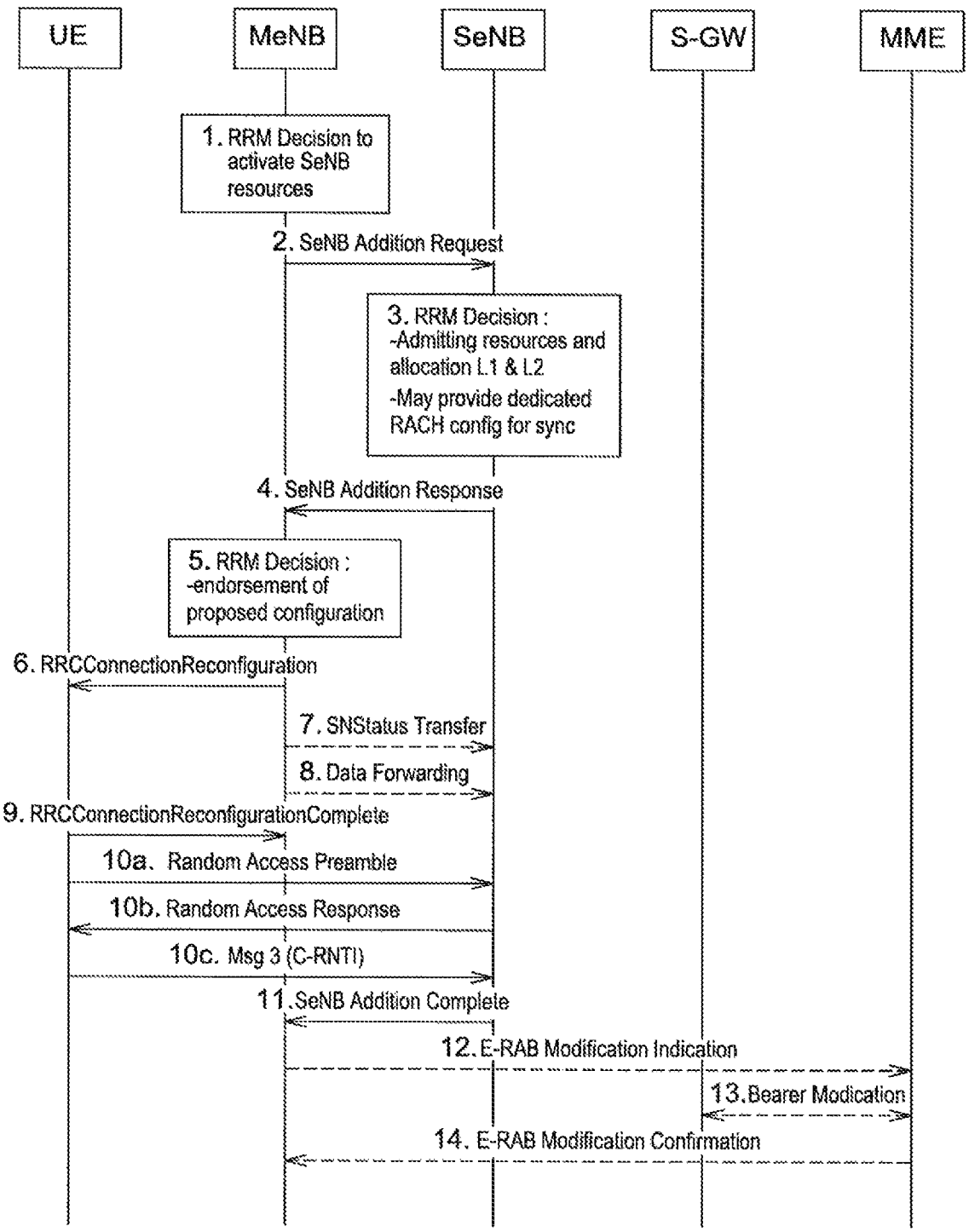
Figure 4:
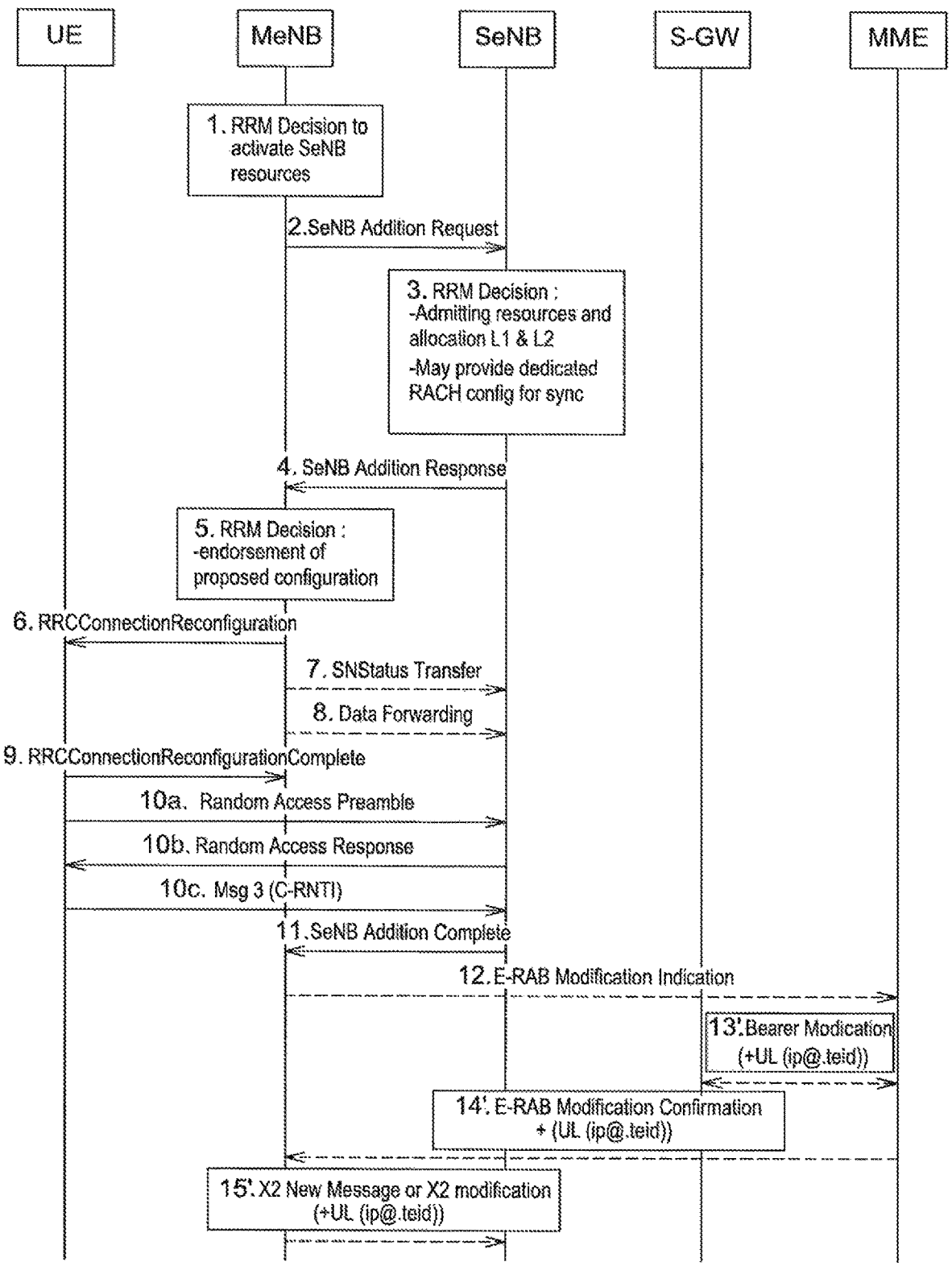
Figure 5:
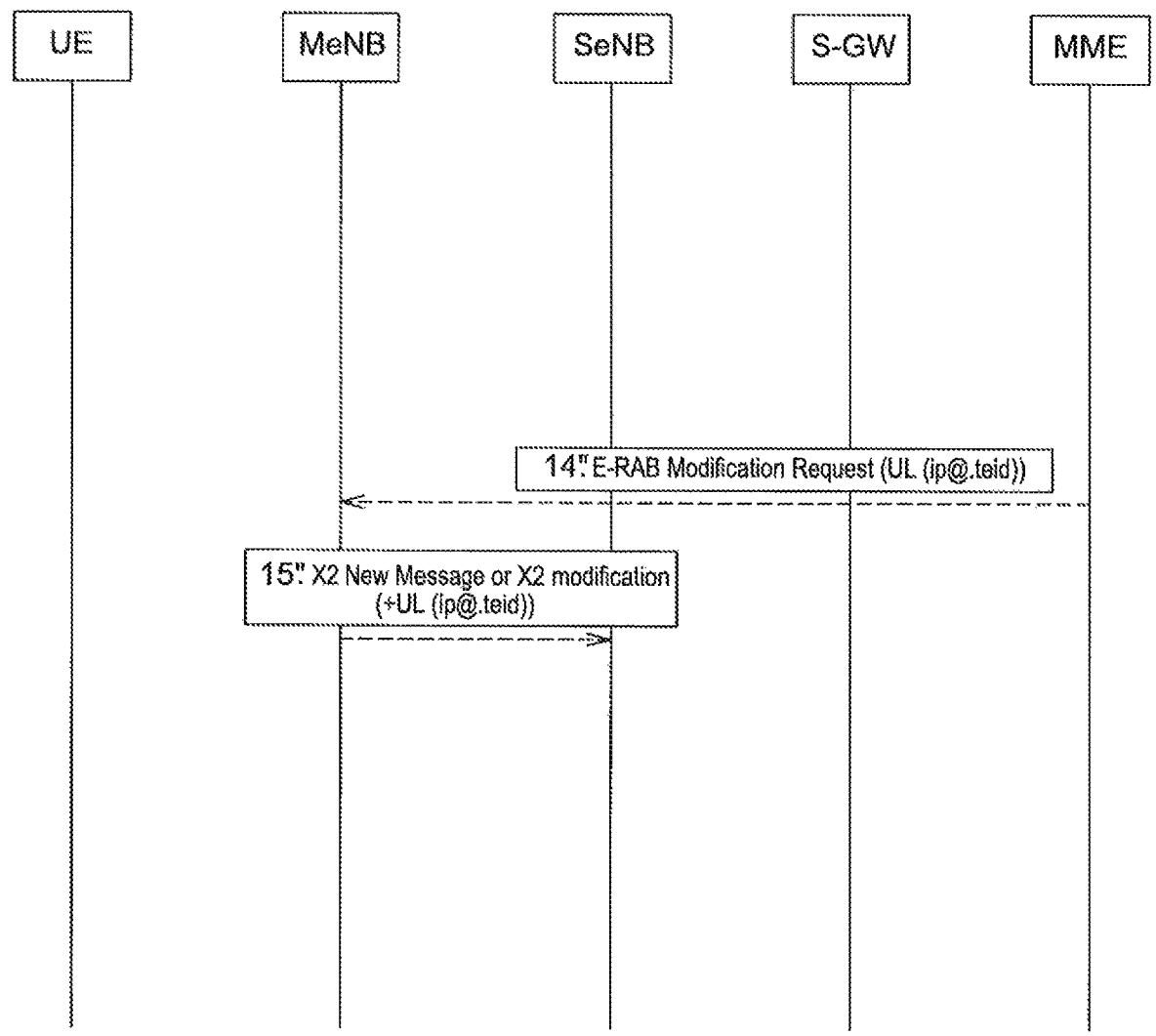

Some embodiments of apparatus and/or methods in accordance with embodiments of the present invention are now described, by way of example only, and with reference to the accompanying drawings, in which:

FIG. 1 is intended to recall the principle of a bearer split option, referred to as Option 1, for dual connectivity operation, FIG. 2 is intended to recall the principle of a protocol architecture alternative, referred to as Alternative 1A, for dual connectivity operation, FIG. 3 is intended to recall a bearer offloading procedure for Alternative 1A, FIG. 4 is intended to illustrate, in a simplified way, an example of signaling flow allowing the switching of an S1-U uplink SGW termination point of a bearer, during offloading of said bearer, according to first embodiments of the present invention FIG. 5 is intended to illustrate, in a simplified way, an example of signaling flow allowing the switching of an S1-U uplink SGW termination point of a bearer, after offloading of said bearer, according to second embodiment of the present invention.

Embodiments of the invention described hereinafter apply more particularly, by way of example, to EPS. However, it should be understood that embodiments of the present invention are not limited to such example, and may apply to systems other than EPS, whether 3GPP or non-3GPP based.

As recalled above, 3GPP is in the process of standardizing in Release 12 the dual connectivity feature as part of the Work Item Small Cell Enhancements—Higher Layer.

Two flavors are being discussed, known as option 1A and option 3C.

When option 1A is used, a data bearer can be "offloaded" from the Master eNB (MeNB) to the Secondary eNB (SeNB). A signaling scheme for bearer offloading procedure, taken from 3GPP TR 36.842, is recalled in FIG. 3.

As recalled in FIG. 3, at the end of this signaling scheme there is a procedure called E-RAB Modification. This procedure is described in 3GPP TR 36.842 as performing the update of the user plane path towards the EPC. This procedure includes:

Sending by MeNB to MME of a E-RAB Modification Indication message (step 12)

Exchanging messages between MME and S-GW (step 13: Bearer Modification)

Sending by MME to SeNB of a E-RAB Modification Confirmation message (step 14).

This E-RAB Modification procedure is intended to be triggered from the MeNB to the MME (step 12) to have the MME request the SGW (step 13) to switch the downlink (DL) termination point for the offloaded bearer. For this to happen the MME would typically provide in the request message of step 13 the new DL addressing information (IP address+Tunnel Endpoint Identifier TEID) of the offloaded bearer in the SeNB.

It is possible that during the offloading procedure (e.g. at step 13 of the E-RAB Modification procedure) the SGW wants to use a feature including changing simultaneously the corresponding uplink SGW user plane termination point for the offloaded bearer.

The above recalled offloading procedure however does not currently allow to use such feature in such case.

It is also possible that the SGW/MME wants to use such feature (switching the SGW UL termination point) after the offloading procedure.

Such feature is also currently not usable in such case.

Embodiments of the invention in particular allow to use such feature in such cases. Embodiments of the invention in particular allow an SGW to switch the S1-U uplink SGW termination point for a bearer which is being offloaded or has been offloaded (said offloading involving a change of DL and/or UL eNB S1-U termination point) from a MeNB to a SeNB, in dual connectivity operation.

FIG. 4 is intended to illustrate, in a simplified way, an example of signaling flow allowing the switching of an S1-U uplink SGW termination point of a bearer, during offloading of said bearer, according to first embodiments of the present invention.

In FIG. 4, same references as in FIG. 3 are used for steps that are common with FIG. 3.

In an embodiment, the SGW provides, e.g. in the response message of step 13' the new UL addressing information (IP address+TEID) in the SGW for the offloaded bearer so that the MME can provide this addressing information back to the MeNB, e.g at step 14' in the ERAB Modification Confirmation or more generally in a message sent from MME to MeNB over S1-MME interface, in particular a message aiming at path switching during the bearer offloading procedure.

In an embodiment, the MeNB then propagates (step 15') this new UL addressing information of the SGW user plane termination point to the SeNB in a message (noted in this example X2 new message or X2 modification) sent over an interface between MeNB and SeNB such as X2 interface. The message at step 15' could be a new message, or an existing message (such as for example X2 Modification Request, or X2 Reconfiguration Request) which would contain the addressing information in the form of a new Information Element (IE).

In an embodiment, a subsequent message is thus proposed after step 14' (step 15') to piggyback the new UL addressing information of the SGW user plane termination point from the MeNB to the SeNB.

In an embodiment, a new message is thus created at the end of the existing bearer offload signaling scheme, in order to provide addressing information of a new UL SGW user plane termination point from the MeNB to the SeNB (assuming the MeNB has received it from the SGW through steps 13', 14').

In an embodiment, some or all of the following steps (illustrated in the example of FIG. 4) may be used:

In step 13' the SGW provides addressing information (IP address, TEID) of a new UL user plane termination point to the MME, e.g. in the response message of step 13' to be used for the offloaded bearer.

In step 14' the MME piggybacks this addressing information of the new UL SGW user plane termination point to the MeNB, e.g. in the ERAB Modification Confirmation message.

In a new step 15' the MeNB provides this addressing information of the new UL SGW user plane termination point to the SeNB.

After step 15', the SeNB uses the received addressing information of the new UL SGW user plane termination point as the addressing information of the destination where to send the packets received from the UE concerning that offloaded bearer.

FIG. 5 is intended to illustrate, in a simplified way, an example of signaling flow allowing the switching of an S1-U uplink SGW termination point of a bearer, after offloading of said bearer, according to second embodiments of the present invention.

Following steps are illustrated in the example of FIG. 5:

In step 14" the MME provides addressing information (IP address, TEID) of a new UL SGW user plane termination point to the MeNB, e.g. in a message called for example E-RAB Modification Request or more generally in a message sent from MME to MeNB over S1-MME interface, in particular a message aiming at modifying the S1 connection.

In step 15" the MeNB provides this addressing information of the new SGW UL user plane termination point to the SeNB, in a message (noted in this example X2 New message or X2 modification) sent over an interface between MeNB and SeNB such as X2 interface. The message at step 15" could be a new message, or an existing message (such as for example X2 Modification Request, or X2 Reconfiguration Request) which would contain the addressing information in the form of a new Information Element (IE). The message sent at step 15" could be the same as the message sent at step 15' or could be different.

Embodiments of the invention thus enable to switch the uplink SGW user plane termination point of a bearer at the same time its downlink user plane termination point is switched to another eNB (here from MeNB to SeNB for the offloaded bearer). This enables for example a SGW to relocate to another internal board the user plane path of a bearer which is now served by a different eNB (the SeNB instead of the MeNB). For example, for load sharing reasons, it could be useful to have an SGW implementation associating some internal user plane boards with the bearers of some particular eNBs.

In one aspect, there is provided a method for allowing the switching of an S1-U uplink SGW termination point of a bearer during, respectively after, offloading of said bearer from a eNB referred to as Master eNB MeNB, to a eNB referred to as Secondary eNB SeNB, in a dual connectivity operation.

Various embodiments are provided, which may be taken alone or in combination, according to various combinations.

In an embodiment, said method includes:
signaling to said SeNB, via said MeNB, during, respectively after, offloading of said bearer, addressing information of a new S1-U uplink SGW user plane termination point to be used for said bearer after said switching.

In an embodiment, said method includes:
a Mobility Management Entity MME signaling said addressing information to said MeNB.

In an embodiment, said method includes:
a Mobility Management Entity MME signaling said addressing information to said MeNB over S1-MME interface during bearer offloading, respectively after bearer offloading.

In an embodiment, said method includes:
said MeNB signaling said addressing information to said SeNB.

In an embodiment, said method includes:
said MeNB signaling said addressing information to said SeNB node over an interface involved in said dual connectivity operation, such as X2 interface.

In an embodiment, said method includes:
said MeNB receiving said addressing information over S1-MME interface during bearer offloading, respectively after bearer offloading.

In an embodiment, said method includes:
said SeNB receiving said addressing information from said MeNB,
said SeNB using said addressing information for routing of uplink user plane traffic of said bearer to said new S1-U uplink user plane SGW termination point.

In an embodiment, said method includes:
said SeNB receiving said addressing information in a message sent by said MeNB to said SeNB over an interface involved in said dual connectivity operation, such as X2 interface.

In an embodiment:
said addressing information include IP addressing information, and UDP addressing information such as Tunnel Endpoint Identifier TEID identifying a GTP-U endpoint.

In other aspects, there are provided entities for performing such method and/or individual step(s) of such method, said entities including, in particular (though not exclusively), for example for an EPS network: eNB, Mobility Management Entity MME in EPC.

In one aspect, there is provided a Mobility Management Entity MME.

Various embodiments are provided, which may be taken alone or in combination, according to various combinations.

In an embodiment, said MME is adapted to:
signal to a eNB referred to as Master eNB MeNB in a dual connectivity operation, during, respectively after, offloading of a bearer from said MeNB to a eNB referred to as Secondary eNB SeNB in said dual connectivity operation, addressing information of a new S1-U uplink SGW user plane termination point in a Serving Gateway SGW, to be used for said bearer.

In an embodiment, said MME is adapted to:
signal said addressing information over S1-MME interface to said MeNB during bearer offloading, respectively after bearer offloading.

In an embodiment:
said addressing information include IP addressing information, and UDP addressing information such as Tunnel Endpoint Identifier TEID identifying a GTP-U endpoint.

In another aspect, there is provided an eNB, referred to as Master eNB MeNB in a dual connectivity operation.

Various embodiments are provided, which may be taken alone or in combination, according to various combinations.

In an embodiment, said eNB is adapted to:
receive from a Mobility Management Entity MME during, respectively after, offloading of a bearer from said MeNB to an eNB referred to as Secondary eNB SeNB in said dual connectivity operation,
signal to said SeNB during, respectively after, offloading of said bearer, addressing information of a new S1-U uplink SGW user plane termination point in a Serving Gateway SGW, to be used for said bearer.

In an embodiment, said eNB is adapted to:
signal said addressing information in a message sent by said MeNB to said SeNB over an interface involved in said dual connectivity operation, such as X2 interface.

In an embodiment, said eNB is adapted to:
receive said addressing information over S1-MME interface during offloading of said bearer, respectively after offloading of said bearer.

In an embodiment:
said addressing information include IP addressing information, and UDP addressing information such as Tunnel Endpoint Identifier TEID identifying a GTP-U endpoint.

In another aspect, there is provided an eNB, referred to as Secondary eNB SeNB in a dual connectivity operation.

Various embodiments are provided, which may be taken alone or in combination, according to various combinations.

In an embodiment, said eNB is adapted to:
receive from a eNB referred to as Master eNB MeNB in said dual connectivity operation, during, respectively after, offloading of a bearer from said MeNB to said MeNB, addressing information of a new S1-U uplink SGW user plane termination point in a Serving Gateway SGW for said bearer,
use said addressing information for routing of uplink user plane traffic of said bearer to said new S1-U uplink SGW user plane termination point.

In an embodiment, said eNB is adapted to:

receive said addressing information in a message sent by said MeNB to said SeNB over an interface involved in said dual connectivity operation, such as X2 interface.

In an embodiment:

said addressing information include IP addressing information, and UDP addressing information such as Tunnel Endpoint Identifier TEID identifying a GTP-U endpoint.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. An apparatus comprising:
    at least one processor; and
    at least one memory including computer program code, the at least one memory and the computer program code configured to, with the at least one processor, cause the apparatus to perform at least,
    in response to a bearer offload from a master radio access network node to a secondary radio access network node while the master radio access network node and secondary radio access network node are in dual connectivity operation:
    signaling, to the master radio access network node, addressing information that identifies a new uplink user plane termination point in a serving gateway for the offloaded bearer,
    wherein the signaling causes uplink traffic associated with said offloaded bearer to be sent by said secondary radio access network node to the new uplink user plane termination point in the serving gateway identified by said addressing information.

2. The apparatus according to claim 1,
    wherein, said addressing information includes internet protocol addressing information and a tunnel endpoint identifier.

3. The apparatus according to claim 1, wherein the at least one memory and the computer program code are further configured to, with the at least one processor, cause the apparatus to perform at least,
    signaling said addressing information in an evolved radio access bearer modification request message.

4. An apparatus comprising:
    at least one processor; and
    at least one memory including computer program code, the at least one memory and the computer program code configured to, with the at least one processor, cause the apparatus to perform at least,
    in response to a bearer offload from the apparatus to a secondary radio access network node while the apparatus and secondary radio access network node are in dual connectivity operation:
    signaling to the secondary radio access network node, addressing information that identifies a new uplink user plane termination point in a serving gateway for the offloaded bearer,
    wherein the signaling causes uplink traffic associated with said offloaded bearer to be sent by said secondary radio access network node to the new uplink user plane termination point in the serving gateway identified by said addressing information.

5. The apparatus according to claim 4, wherein the at least one memory and the computer program code are further configured to, with the at least one processor, cause the apparatus to perform at least,
    receiving said addressing information in modification request message.

6. The apparatus according to claim 4,
    wherein, said addressing information includes internet protocol addressing information and a tunnel endpoint identifier.

7. An apparatus comprising:
    at least one processor; and
    at least one memory including computer program code, the at least one memory and the computer program code configured to, with the at least one processor, cause the apparatus to perform at least,
    receiving, from a master radio access network node, addressing information that identifies a new uplink user plane termination point in a serving gateway for a bearer offloaded to the apparatus from the master radio access network node, wherein the receiving is caused by the bearer offload from the master radio access network node to the apparatus while the master radio access network node and the apparatus are in dual connectivity operation; and
    sending uplink traffic associated with said offloaded bearer to the new uplink user plane termination point in the serving gateway identified by said addressing information.

8. The apparatus according to claim 7,
    wherein, said addressing information includes internet protocol addressing information and a tunnel endpoint identifier.

9. The apparatus according to claim 7, wherein the at least one memory and the computer program code are further configured to, with the at least one processor, cause the apparatus to perform at least,
    receiving said addressing information in a modification request message.

* * * * *